(12) United States Patent
Ma et al.

(10) Patent No.: US 10,018,752 B2
(45) Date of Patent: Jul. 10, 2018

(54) DIFFUSION SHEET, BACKLIGHT MODULE AND LIQUID CRYSTAL DISPLAY DEVICE

(71) Applicant: BOE TECHNOLOGY GROUP CO., LTD., Beijing (CN)

(72) Inventors: Yongda Ma, Beijing (CN); Yuxin Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 275 days.

(21) Appl. No.: 14/904,770

(22) PCT Filed: Jun. 17, 2015

(86) PCT No.: PCT/CN2015/081611
§ 371 (c)(1),
(2) Date: Jan. 13, 2016

(87) PCT Pub. No.: WO2016/110055
PCT Pub. Date: Jul. 14, 2016

(65) Prior Publication Data
US 2016/0370511 A1    Dec. 22, 2016

(30) Foreign Application Priority Data
Jan. 7, 2015 (CN) .......................... 2015 1 0007384

(51) Int. Cl.
*G02B 5/02*   (2006.01)
*G02B 1/14*   (2015.01)
*F21V 8/00*   (2006.01)

(52) U.S. Cl.
CPC ............. *G02B 5/0215* (2013.01); *G02B 1/14* (2015.01); *G02B 5/0236* (2013.01); *G02B 6/0051* (2013.01)

(58) Field of Classification Search
CPC ...... G02B 5/0215; G02B 5/2036; G02B 1/14; G02B 6/0051
(Continued)

(56) References Cited

U.S. PATENT DOCUMENTS

| 5,124,900 A * | 6/1992 | Varey | F21V 1/22 |
| | | | 362/351 |
| 2006/0050517 A1 * | 3/2006 | LaFleiche | B44C 5/005 |
| | | | 362/351 |

(Continued)

FOREIGN PATENT DOCUMENTS

| CN | 201072450 Y | 6/2008 |
| CN | 201096929 Y | 8/2008 |

(Continued)

OTHER PUBLICATIONS

International Search Report of PCT/CN2015/081611 in Chinese, dated Oct. 9, 2015 with English translation.

(Continued)

*Primary Examiner* — Laura Tso
(74) *Attorney, Agent, or Firm* — Collard & Roe, P.C.

(57) ABSTRACT

A diffusion sheet, a backlight module and a liquid crystal module are disclosed. The diffusion sheet comprises a paper fiber layer (1) with surfaces on two sides both disposed with a light-transmissive protection layer (2, 3). The diffusion sheet can well diffuse light passing through the diffusion sheet, and hence improve uniformity of light passing through the diffusion sheet. A paper fiber layer (1) is employed in the diffusion sheet for diffusion, which makes a paper fiber layer (1) be prepared at a low cost and have a small weight, and hence reduce the preparation cost and weight of a diffusion sheet to provided convenience for transfer of a product.

19 Claims, 4 Drawing Sheets

(58) Field of Classification Search
USPC .............. 362/97.2, 311.01–311.15, 351–361
See application file for complete search history.

(56) References Cited

U.S. PATENT DOCUMENTS

| | | |
|---|---|---|
| 2006/0262310 A1 | 11/2006 | Starry et al. |
| 2009/0122575 A1* | 5/2009 | Omura ................. G02B 6/0038 362/608 |
| 2009/0279018 A1 | 11/2009 | Lin |
| 2011/0045177 A1 | 2/2011 | Nishimura et al. |
| 2012/0320606 A1* | 12/2012 | Vossoughi ................ F21V 1/00 362/351 |
| 2014/0140091 A1* | 5/2014 | Vasylyev ............... G02B 6/001 362/606 |
| 2016/0369972 A1* | 12/2016 | Thijssen ................... F21K 9/62 |

FOREIGN PATENT DOCUMENTS

| | | |
|---|---|---|
| CN | 103630962 A | 3/2014 |
| CN | 104459846 A | 3/2015 |
| JP | S 62-11905 B2 | 3/1987 |
| JP | 2002-014207 A | 1/2002 |
| JP | 2013-161779 A | 8/2013 |
| TW | 200949303 A | 12/2009 |

OTHER PUBLICATIONS

Notice of Transmittal of the International Search Report of PCT/CN2015/081611 in Chinese, dated Oct. 9, 2015.
Written Opinion of the International Searching Authority of PCT/CN2015/081611 in Chinese, dated Oct. 9, 2015 with English translation.
Chinese Office Action in Chinese Application No. 201510007384.4 in Chinese, dated Apr. 1, 2016 with English translation.

* cited by examiner

DIFFUSION SHEET, BACKLIGHT MODULE AND LIQUID CRYSTAL DISPLAY DEVICE

CROSS REFERENCE TO RELATED APPLICATIONS

This application is the National Stage of PCT/CN2015/081611 filed on Jun. 17, 2015, which claims priority under 35 U.S.C. § 119 of Chinese Application No. 201510007384.4 filed on Jan. 7, 2015, the disclosure of which is incorporated by reference.

TECHNICAL FIELD

At least one embodiment of the present invention pertains to a diffusion sheet, a backlight module and a liquid crystal display device.

BACKGROUND

A backlight module belongs to a kind of a backlight assembly. Particularly in a direct-type backlight module, a diffusion sheet is required to be disposed in the backlight module, so as to make the backlight module supply uniform light.

For example, a diffusion sheet in a backlight module mainly includes a light-transmissive sheet-like substrate with surfaces on its two sides, on which a plurality of spherical particles is uniformly distributed. The spherical particles are different in light transmission and refraction coefficient from the substrate. The periphery surfaces of the spherical particles are uniformly encapsulated with a surface coating layer that is different in light-transmission and refraction coefficient from both the substrate and the spherical particles. Light can be refracted many times by the substrate, the spherical particles and the surface coating layer in a process of passing through the diffusion sheet, so as to produce a uniform diffusing effect.

SUMMARY

The embodiment of the present invention provides a diffusion sheet, a backlight module and a liquid crystal display device. The substrate of the diffusion sheet can be prepared with a low cost and is of a light weight.

At least one of the embodiments in the present invention provides a diffusion sheet that comprises a paper fiber layer, and surfaces on two sides of the paper fiber layer are both disposed with a light-transmissive protective layer.

At least one of the embodiments in the present invention provides a diffusion sheet that includes a paper fiber layer that includes paper fibers and an organic film layer in which the paper fibers are disposed.

At least one of the embodiments in the present invention provides a backlight module including any diffusion sheet provided in the above technical solutions.

At least one of the embodiments in the present invention provides a liquid crystal display device including the backlight module according to the above technical solutions.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and, it is not limitative to the scope of the present invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

The inventors of the application has noted, in research, that polyethylene terephthalate is employed as the material for preparation of a substrate and surface coating layers on two sides of the substrate in current diffusion sheets and the preparation cost is high and weight of product is heavy.

Figure 1A:
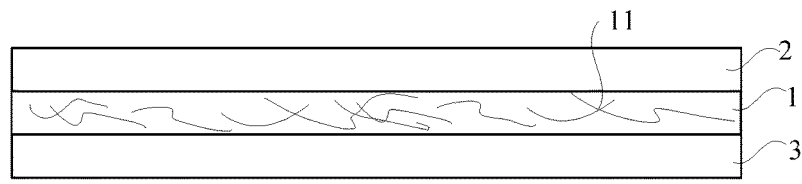
FIG. 1a is a schematic view for a structure of diffusion sheet in an embodiment of the present invention.

Reference to FIG. 1a is conducted. As illustrated in FIG. 1a, a diffusion sheet, provided in at least one of the embodiments, comprises a paper fiber layer 1, and surfaces on two sides of the paper fiber layer 1 are both disposed with a light-transmissive protection layer such as a protection layer 2 and a protection layer 3 as illustrated in FIG. 1a.

The paper fiber layer 1 can be any light-transmissive film layer including paper fibers 11. For example, the paper fiber layer 1 can be formed of a paper material to make the paper fibers 11 included inside the paper fiber layer 1. For example, the material for forming paper fibers 11 can also include a light-transmissive organic material (for example, resin) and paper fibers disposed in the organic material.

For example, the paper fibers 11 can include fiber materials such as plant fiber, mineral fiber or synthetic fiber.

In at least one of the embodiments, the material for preparation of a protection layer 2 and a protection layer 3 can each include a transparent material. For example, a protection layer 2 and a protection layer 3 can be prepared from a transparent material.

In the embodiment of the present invention, in a process of light passing through the diffusion sheet mentioned-above, a part of light may directly pass through gaps among paper fibers 11 inside the paper fiber layer 11 and other part of light will irradiate on the paper fibers 11 and undergoes diffuse reflection, which can favorably diffuse light passing through the diffusion sheet and hence improve uniformity of light passing through the diffusion sheet.

The paper fiber layer 1 is employed in the diffusion sheet above for light diffusion. Because the paper fiber layer 1 can be prepared at a low lost and with less weight, and therefore the preparation cost and the weight of a diffusion sheet can be reduced, which is beneficial to product circulation.

For a diffusion sheet in any embodiment above, paper fibers 11 inside a paper fiber layer 1 can be arranged orderly or disorderly.

For example, if paper fibers inside a paper fiber layer 1 are arranged disorderly, paper fibers 11 inside the paper fiber layer 1 can form a network structure to improve diffusing uniformity of light via the paper fiber layer 1.

In at least one of the embodiments, protection layers disposed on two sides of a paper fiber layer 1 can employ, but not limit to, following modes, and these modes will be introduced specifically hereinafter.

Mode 1: the material for preparation of each protection layer includes a waterproof material. For example, each protection layer is prepared by a waterproof material, that is, a protection layer 2 and a protection layer 3 are both prepared by a waterproof material.

Or, mode 2: the material for preparation of each protection layer includes a fire-proof material. For example, each protection layer is prepared by a fire-proof material, that is, a protection layer 2 and a protection layer 3 are both prepared by a fire-proof material.

Or, mode 3: a protection layer disposed on one of the surfaces on two sides includes a waterproof layer, and a protection layer disposed on the other one of the surfaces on two sides includes a fireproof material. For example, one protection layer is prepared by a waterproof material and the other protection layer is prepared by a fire-proof material.

Figure 1B:
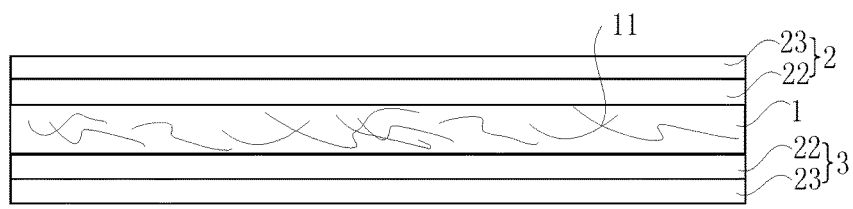
FIG. 1b is a schematic view for a structure of a protection layer including a waterproof layer and a fire-proof layer in a diffusion sheet provided in an embodiment of the present invention.

Or, mode 4: each protection layer includes a waterproof layer 22 and a fireproof layer 23, as illustrated in FIG. 1b. For example, a protection layer 2 and a protection layer 3 are both provided with a waterproof layer prepared by a waterproof material and a fireproof layer prepared by a fire-proof material.

In the embodiment of the present invention, the waterproof material and the fire-proof material can be any of commonly used materials in the field, which will not be introduced herein.

Diffusing particles are included in at least one of a paper fiber layer 1, a protection layer 2 and a protection layer 3 in a diffusion sheet provided in at least one of the embodiments.

Figure 2:
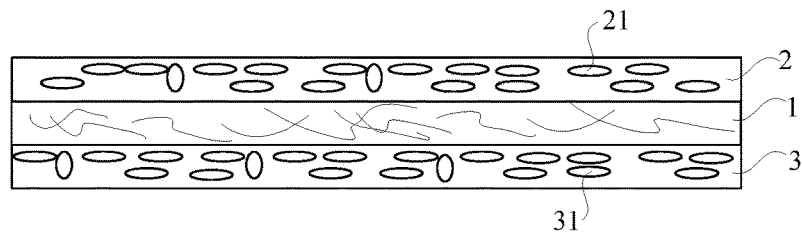
FIG. 2 is a schematic view for a structure of a diffusion sheet with diffusing particles disposed inside merely two protective layers in another embodiment of the present invention.

Mode 1, as illustrated in FIG. 2, both a protection layer 2 and a protection layer 3 are provided with diffusing particles therein. For example, a protection layer 2 is provided with diffusing particles 21 therein and a protection layer 3 is provided with diffusing particles 31 therein. Upon light passing through a protection layer including diffusing particles, light can be diffused at positions where diffusing particles are located, and hence improving diffusing effect of a diffusion sheet.

Figure 3:
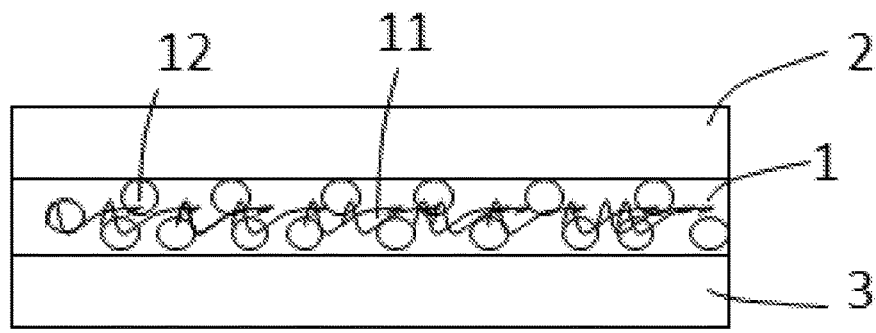
FIG. 3 is a schematic view for a structure of a diffusion sheet with diffusing particles disposed inside merely a paper fiber layer in an embodiment of the present invention.

Mode 2, as illustrated in FIG. 3, diffusing particles 12 are included merely in a paper fiber layer 1 in a diffusion sheet provided in the embodiment.

Figure 4:
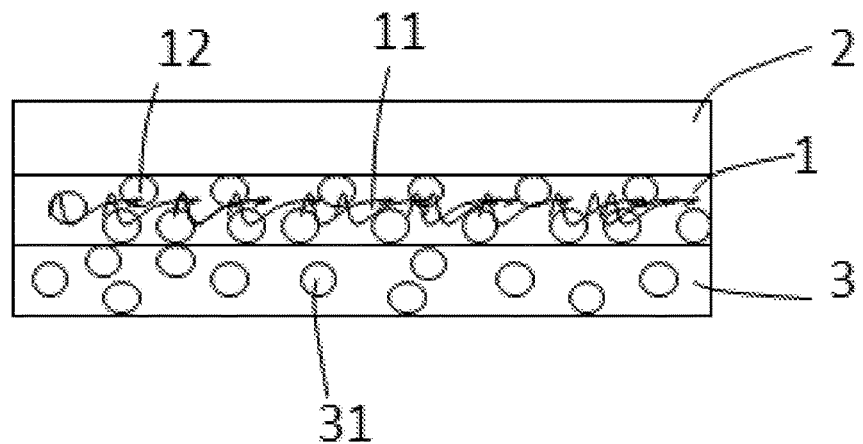
FIG. 4 is a schematic view for a structure of a diffusion sheet with diffusing particles disposed inside a paper fiber layer and a protection layer in an embodiment of the present invention.

Mode 3, as illustrated in FIG. 4, diffusing particles are included merely in a paper fiber layer 1 and a protection layer 3. For example, diffusing particles 12 are included in a paper fiber layer 1 and diffusing particles 31 are included in a protection layer 3.

Mode 4, diffusing particles are provided merely in a paper fiber layer 1 and a protection layer 2 (not illustrated in a figure).

Figure 5:
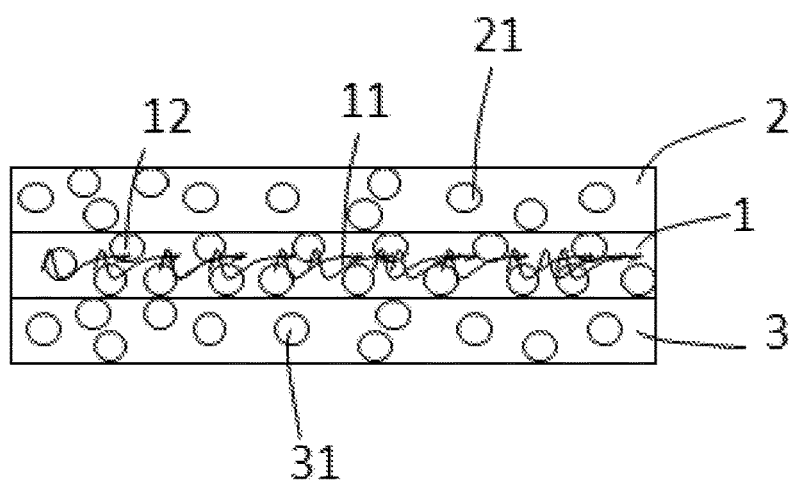
FIG. 5 is a schematic view for a structure of a diffusion sheet with diffusing particles disposed inside a paper fiber layer and two protection layers in an embodiment of the present invention.

Mode 5, as illustrated in FIG. 5, a paper fiber layer 1 is provided with diffusing particles 12 therein and a protection layer 2 is provided with diffusing particles 21 therein, further a protection layer 3 is provided with diffusing particles 31 therein, so as to further improve diffusing effect of a diffusion sheet.

Figure 6A:
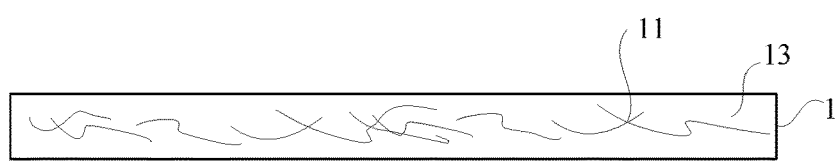
FIG. 6a is a schematic view for a structure of a diffusion sheet including merely a paper fiber layer in an embodiment of the present invention.

Another diffusion sheet is provided in at least one of the embodiments of the present invention, as illustrated in FIG. 6a, and the diffusion sheet includes a paper fiber layer 1 including paper fibers 11 and an organic film layer 13. The paper fibers 11 are disposed in the organic film layer 13.

For example, paper fibers 11 can include a fiber material such as plant fiber, mineral fiber or synthetic fiber.

For example, a paper fiber layer 1 can be formed by mixing paper fibers 11 and an organic film layer 13. Generally, after material of an organic film layer 13 and paper fibers 11 are mixed together, a paper fiber layer 1 can be obtained via curing treatment.

Because the organic film layer 13 can act to protect the paper fibers 11, the paper fiber layer 1 including the organic film layer 13 and the paper fibers 11 can be employed as a diffusion sheet alone. For example, to avoid deformation of paper fiber 11 due to influence of moisture, the material of an organic film layer 13 can include a waterproof material; and/or, to avoid deformation of paper fibers 11 due to irradiation of light source in a backlight module, the material of an organic film layer 13 can include a fire-proof material.

Of course, the embodiment of the present invention will not be limited to types of materials for the organic film layer 13 and modes of forming a paper fiber layer 1 by means of the material of an organic film layer 13 together with paper fibers 11, as long as the material of the organic film layer 13 and the paper fibers 11 together form a paper fiber layer 1 that can protect the paper fibers 11.

In at least one of the embodiments, paper fibers 11 in a paper fiber layer 1 can be arranged orderly or disorderly.

In at least one of the embodiments, when paper fibers 11 in a paper fiber layer 1 is arranged disorderly, paper fibers 11 in the paper fiber layer 1 form a network structure.

Figure 6B:
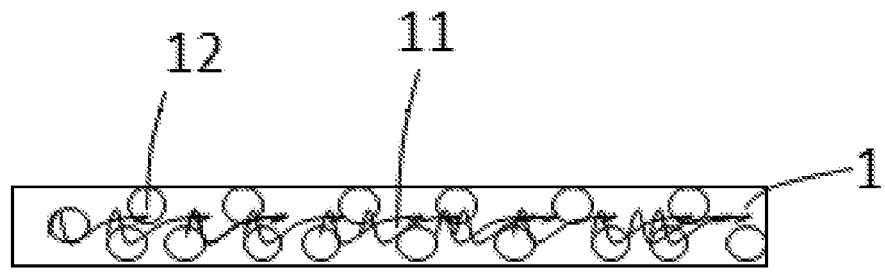
FIG. 6b is a schematic view for a structure of a diffusion sheet including merely a paper fiber layer disposed inside with diffusing particles in an embodiment of the present invention.

A paper fiber layer included in a diffusion sheet provided in the embodiment of the present invention can be further provided inside with diffusing particles. For example, as illustrated in FIG. 6b, diffusing particles 12 are included in a paper fiber layer 1.

Figure 7A:
FIG. 7a is a schematic view for a structure of a diffusion sheet including a paper fiber layer and a protection layer in an embodiment of the present invention.

In at least one of the embodiments, as illustrated in FIG. 7a, a diffusion sheet can further include at least one light-transmissive protection layer 2 that is disposed on at least one surface of a paper fiber layer 1. In FIG. 7a, a diffusion sheet including one protection layer is taken as an example for description. Reference to FIG. 1a to FIG. 5 can be conducted for an example that a diffusion sheet includes two protection layers, which will not be specified herein.

Figure 7B:
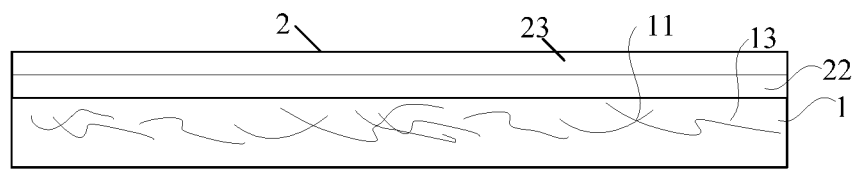
FIG. 7b is a schematic view for a structure of a protection layer including a waterproof layer and a fire-proof layer in a diffusion sheet in an embodiment of the present invention.

In at least one of the embodiments, the material for preparation of each protection layer includes a transparent material. For example, the transparent material can be at least one of a waterproof material and a fire-proof material, that is, each of the protection layers can include at least one of a waterproof layer and a fire-proof layer. For example, as illustrated in FIG. 7b, a protection layer 2 can include a waterproof layer 22 and a fire-proof layer 23.

For example, the protection layer 2 can be formed of the material that is different from the material of the organic film layer 13 included in a paper fiber layer 1, which can play a different role in protecting paper fibers 11.

Figure 7C:
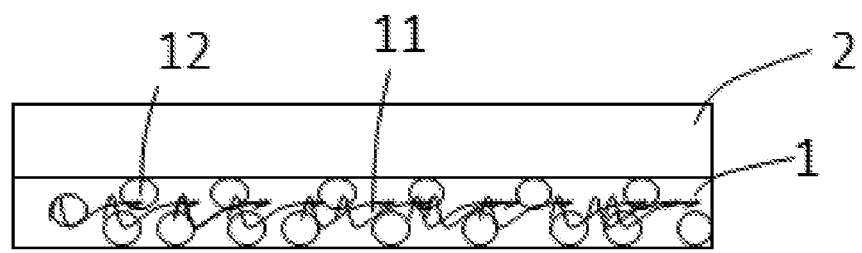
FIG. 7c is a schematic view for a structure of a diffusion sheet including a protection layer and with diffusing particles merely disposed inside a paper fiber layer in an embodiment of the present invention.
Figure 7D:
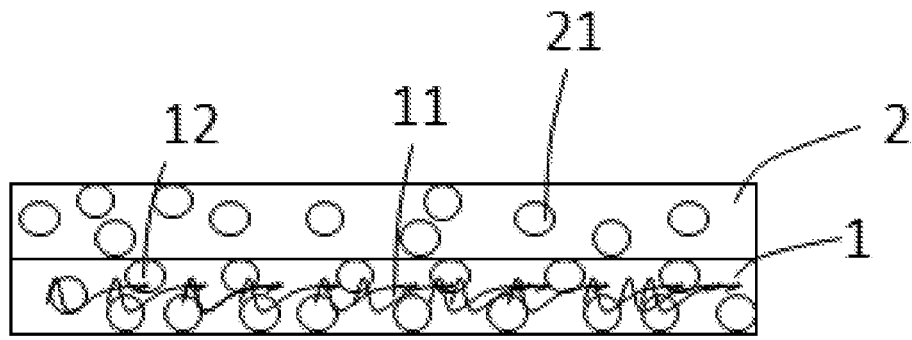
FIG. 7d is a schematic view for a structure of a diffusion sheet with diffusing particles disposed inside a protection layer in an embodiment of the present invention.

For example, when a diffusion sheet includes a paper fiber layer and at least one protection layer, at least one of both the paper fiber layer 1 and the at least one protection layer can include diffusing particles. For example, diffusing particles are included in a paper fiber layer 1 as illustrated in FIG. 7c; and/or, a diffusion sheet can include a protection layer 2 in which diffusing particles 21 are included as illustrated in FIG. 7d, or a diffusion sheet can include a protection layer 2 and a protection layer 3, and diffusing particles are included in at least one of these two protection layers.

At least one of the embodiments of the present invention provides a backlight module that includes any diffusion sheet provided in the above embodiments.

Figure 8:
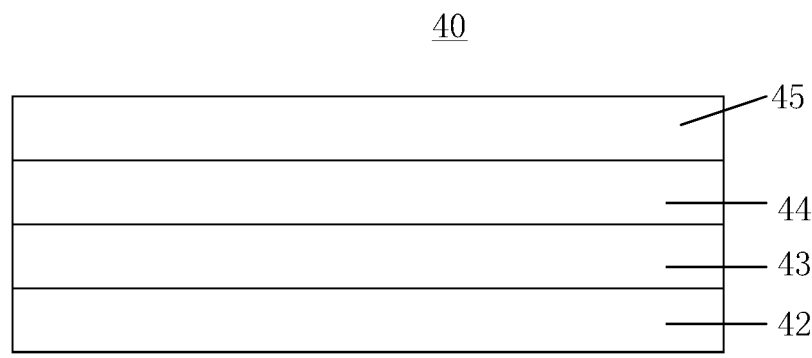
FIG. 8 is a schematic view for a structure of a backlight module in an embodiment of the present invention.

For example, a backlight module can include a light guide plate and a diffusion sheet that is disposed on a side of the light guide plate. For example, as illustrated in FIG. 8, a backlight module 40 can include a light guide plate 42, a lower diffusion sheet 43, a prism sheet 44 and an upper diffusion sheet 45. The lower diffusion sheet 43 is mainly for collecting light emitted from a light guide plate 42 and then uniformly projecting the light to the prism sheet 44. The upper diffusion sheet 45 is mainly for fogging light emitted from the prism sheet 44 and then making the light uniformly pass therethrough. The upper diffusion sheet 45 can also play a role of protecting the prism sheet 44. For example, at least one of the upper diffusion sheet 45 and the lower diffusion sheet 43 can be a diffusion sheet provided in any embodiments above.

At least one of the embodiments of the present invention provides a liquid crystal display device that includes a backlight module provided in the above embodiments.

Figure 9:
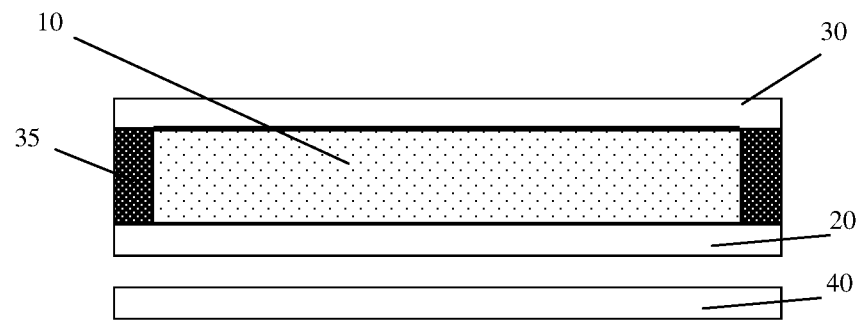
FIG. 9 is a schematic view for a structure of a liquid crystal display device in an embodiment of the present invention.

For example, as illustrated in FIG. 9, a liquid crystal display device, provided in the embodiment of the present invention, can include an array substrate 20 and a cell-assembly substrate 30. The array substrate 20 and the cell-assembly substrate 30 are cell-assembled and sealed by sealant 35 to form a liquid crystal cell that is filled with liquid crystal material 10. The cell-assembly substrate 30 can be, for example, a color filter substrate. The display device further includes a backlight module 40 which provides backlight for the array substrate 20.

For example, the display device can be any product or component having a display function such as a liquid crystal display panel, a cell phone, a tablet computer, a TV set, a display, a laptop computer, a digital photo frame, a navigator and so on.

What are described above is related to the illustrative embodiments of the disclosure only and not limitative to the scope of the disclosure. The scopes of the disclosure are defined by the accompanying claims.

This application claims the benefit of Chinese patent application No. 201510007384.4 filed in China on Jan. 7, 2015, which is incorporated by reference herein as a part of this application.

The invention claimed is:

1. A diffusion sheet, comprising a paper fiber layer, wherein surfaces on two sides of the paper fiber layer are both provided with a light-transmissive protection layer, wherein
the paper fiber layer is provided inside with diffusing particles; or,
at least one of the two protection layers is provided inside with diffusing particles; or,
the paper fiber layer is provided inside with diffusing particles and at least one of the two protection layers is provided inside with diffusing particles.

2. The diffusion sheet according to claim 1, wherein a material of the light-transmissive protection layer comprises a transparent material.

3. The diffusion sheet according to claim 1, wherein paper fibers in the paper fiber layer are arranged orderly or disorderly.

4. The diffusion sheet according to claim 3, wherein where the paper fibers in the paper fiber layer are arranged disorderly, the paper fibers in the paper fiber layer form a network structure.

5. The diffusion sheet according to claim 1, wherein a material of each of the protection layer comprises a waterproof material or a fireproof material.

6. The diffusion sheet according to claim 2, wherein a material of each of the protection layer comprises a waterproof material; or, a material of each of the protection layer comprises a fireproof material.

7. The diffusion sheet according to claim 1, wherein each of the protection layers comprises a waterproof layer and a fire-proof layer.

8. The diffusion sheet according to claim 1, wherein the protection layer disposed on one of the surfaces on the two sides comprises a waterproof layer and the protection layer disposed on the other of the surfaces on the two sides comprises a fire-proof layer.

9. A diffusion sheet, comprising a paper fiber layer, wherein the paper fiber layer comprises paper fibers and an organic film layer in which the paper fibers are disposed, and the paper fiber layer is provided inside with diffusing particles.

10. The diffusion sheet according to claim 9, wherein the paper fibers in the paper fiber layer are arranged orderly or disorderly.

11. The diffusion sheet according to claim 10, wherein where the paper fibers in the paper fiber layer are arranged disorderly, the paper fibers in the paper fiber layer form a network structure.

12. The diffusion sheet according to claim 9, further comprising at least one light-transmissive protection layer, wherein the at least one light-transmissive protection layer is disposed on at least one surface of the paper fiber layer.

13. The diffusion sheet according to claim 12, wherein a material of each of the protection layers comprises a transparent material.

14. The diffusion sheet according to claim 12, wherein each of the protection layers comprises at least one of a waterproof layer and a fire-proof layer.

15. The diffusion sheet according to claim 12, wherein the diffusion sheet comprises one protection layer and the one protection layer is provided inside with diffusing particles, or, the diffusion sheet comprises two protection layers and at least one of the two protection layers is provided with diffusing particles.

16. A backlight module, comprising the diffusion sheet according to claim 1.

17. A liquid crystal display device, comprising the backlight module according to claim 16.

18. A backlight module, comprising the diffusion sheet according to claim 9.

19. A diffusion sheet, comprising a paper fiber layer, wherein
the paper fiber layer comprises paper fibers and an organic film layer in which the paper fibers are disposed; and
the diffusion sheet comprises one protection layer and the one protection layer is provided inside with diffusing particles, or, the diffusion sheet comprises two protection layers and at least one of the two protection layers is provided with diffusing particles.

* * * * *